United States Patent [19]
Sasaki

[11] Patent Number: 4,862,445
[45] Date of Patent: Aug. 29, 1989

[54] DISK SETTING MECHANISM FOR A DISK PLAYER

[75] Inventor: Mashiko Sasaki, Abiko, Japan

[73] Assignee: Asahi Kogaku Kogyo K.K., Tokyo, Japan

[21] Appl. No.: 128,107

[22] Filed: Dec. 3, 1987

[30] Foreign Application Priority Data

Dec. 3, 1986 [JP] Japan .................. 61-288489

[51] Int. Cl.⁴ .................. G11B 1/00; G11B 17/04; G11B 25/04
[52] U.S. Cl. .................. 369/75.2; 369/292
[58] Field of Search .................. 369/75.2, 77.2, 292

[56] References Cited

U.S. PATENT DOCUMENTS

| | | |
|---|---|---|
| 4,268,498 | 12/1986 | Takamatsu et al. . |
| 4,467,464 | 8/1984 | Sugiyama et al. . |
| 4,467,465 | 8/1984 | Saito et al. . |
| 4,489,407 | 12/1984 | Kiguchi . |
| 4,509,158 | 4/1985 | Kang . |
| 4,527,264 | 7/1985 | Costemore . |
| 4,561,085 | 12/1985 | Funabashi . |
| 4,564,930 | 1/1986 | Funabashi et al. . |
| 4,580,256 | 4/1986 | Inaba et al. . |
| 4,623,995 | 11/1986 | Kawamura et al. . |
| 4,625,304 | 11/1986 | Kanamaru et al. . |
| 4,627,042 | 12/1986 | Hara . |
| 4,631,716 | 12/1986 | Ikedo et al. .................. 369/75.2 |
| 4,672,598 | 6/1987 | Koken et al. .................. 369/75.2 |
| 4,706,237 | 11/1987 | Nakayama .................. 369/75.2 |

FOREIGN PATENT DOCUMENTS

61-45461 3/1986 Japan .

Primary Examiner—Steven L. Stephan
Attorney, Agent, or Firm—Sandler & Greenblum

[57] ABSTRACT

A disk setting mechanism for a disk player is provided which includes a disk tray for receiving a disk, the disk tray being reciprocably moved between an inwardly retracted position and an outwardly projected position through an intermediate position. The disclosed disk setting mechanism includes a holding device for holding the disk tray when the disk tray is at the outwardly projected position where it is inclined downwardly toward a projected end of the disk tray. The disclosed disk setting mechanism further includes a first feeding apparatus for reciprocably transferring the disk tray between the outwardly projecting position and the intermediate position along the angle of inclination of the disk tray, and a second feeding apparatus for transferring the disk tray between the intermediate position to the inwardly retracted while shifting the disk tray between the inclined state and a horizontal state. Features of the present invention facilitate loading and unloading of the disk. Further, a disk player according to the teachings of the present invention is generally smaller and shorter than prior art disk players.

39 Claims, 7 Drawing Sheets

DISK SETTING MECHANISM FOR A DISK PLAYER

BACKGROUND OF THE INVENTION

This invention relates to a disk player such as a compact-disk player which includes a disk tray to be reciprocally moved between its inwardly retracted position and its outwardly projected position with a disk received thereon, and more particularly to a disk setting mechanism thereof.

Figure 12:
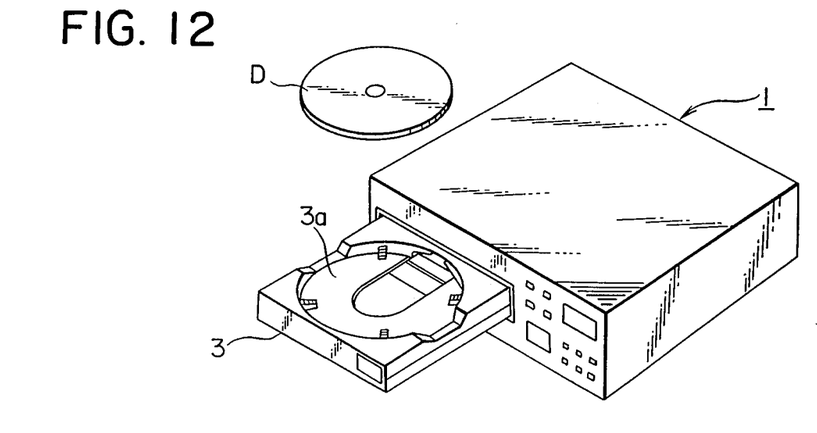
FIG. 12 is a perspective view of a conventional disk player.

Conventionally, such a disk player has been proposed as illustrated in FIG. 12, which includes a disk tray 3 to be reciprocally moved between its inwardly retracted position and its outwardly projected position with a disk D received thereon in order to facilitate loading and unloading the disk player 1 with the disk D. With the disk player thus constructed, sticking of the disk to an information reader section is prevented, and the overall height of the device is reduced due to elimination of a disk cover required in other types thereof.

In setting the disk D at its play position, with the above constructed disk player the disk tray 3 is first fed to its outwardly projected position and the disk D is placed on a disk receiving seat 3a of the disk tray 3. The disk tray 3 is then horizontally drawn into the disk player 1 toward its inwardly retracted position, where the disk tray 3 is then moved down in a vertical direction to seat the disk D on a turntable, which is, not shown. To the contrary, when the disk D is to be taken out from the disk player 1, the disk tray 3 is first moved up in the vertical direction and then fed in the horizontal direction from its retracted position to its projected position.

However, in the above constructed disk player, when the disk tray 3 is at its outwardly projected position, it extends horizontally from the disk player 1 and hence it sometimes becomes difficult for an operator to observe the disk receiving seat 3a of the disk tray 3. In such a case, the operator may have to look into the disk tray 3 in order to place the disk D onto the disk receiving seat 3a, which makes it inconvenient to place the disk D onto, and take it out from the disk tray 3.

Further, the disk setting mechanism of the above constructed disk player comprises a horizontal feeding mechanism for reciprocally transferring the disk tray 3 in a horizontal direction between its inwardly retracted position and its outwardly projected position, and an additional lifting mechanism for shifting the disk tray 3 between its lifted position and its lowered position at its inwardly retracted position. This makes the disk setting mechanism complicated in construction and hence it becomes difficult to reduce the overall size and height of the disk setting mechanism, and, therefore of the disk player itself.

SUMMARY OF THE INVENTION

Accordingly, it is an object of the present invention to provide a disk setting mechanism for a disk player capable of facilitating loading and unloading of the disk player with a disk.

Another object of the invention is to provide a disk setting mechanism for a disk player which is simplified in construction, and, therefore, which reduces the overall size and height thereof.

For the above purposes, according to the invention, there is provided a disk setting mechanism for a disk player, the mechanism comprising a disk tray for receiving a disk thereon, said disk tray being reciprocally movable between its inwardly retracted position and its outwardly projected position. The improvement in the mechanism comprises holding means for holding said disk tray, when said disk tray is at its outwardly projected position, in such a state that it is inclined downwardly toward a projected end thereof;

first feeding means for reciprocally transferring said disk tray between its outwardly projected position and its intermediate position while maintaining the disk tray in its inclined state; and second feeding means for reciprocally transferring said disk tray between its intermediate position and its inwardly retracted position while shifting said disk tray between its inclined state and its horizontal state.

The above and other objects, features and advantages of the present invention will become apparent from the following description and the appended claims, taken in conjunction with the accompanying drawings.

DESCRIPTION OF THE PREFERRED EMBODIMENTS

Figure 1:
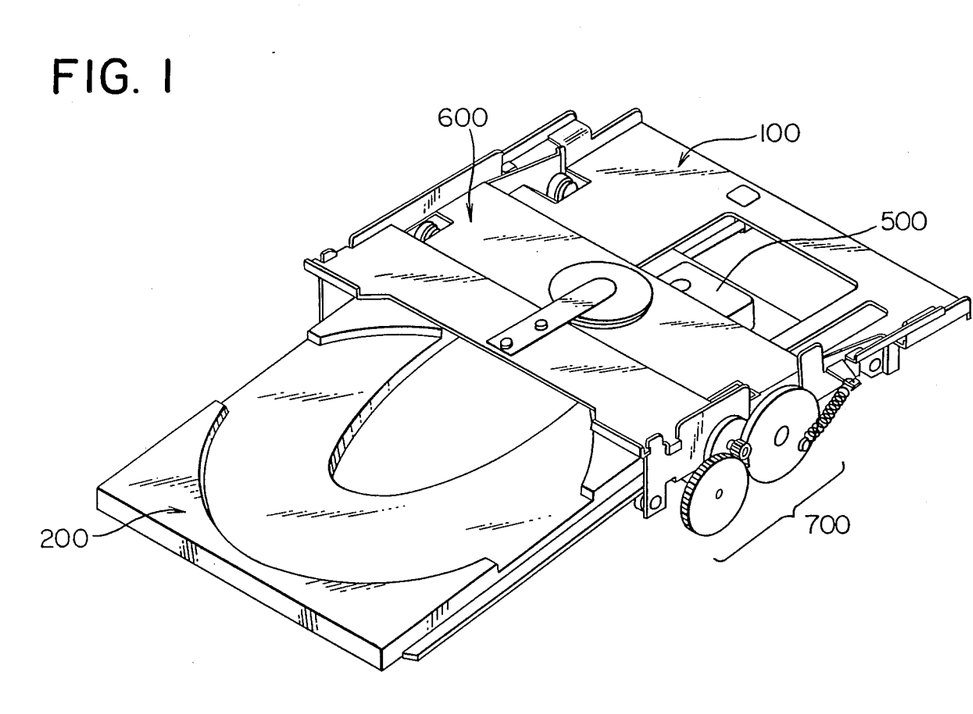
FIG. 1 is a perspective view of a disk setting mechanism embodying the invention wherein a disk tray is at its outwardly projected position.
Figure 2:
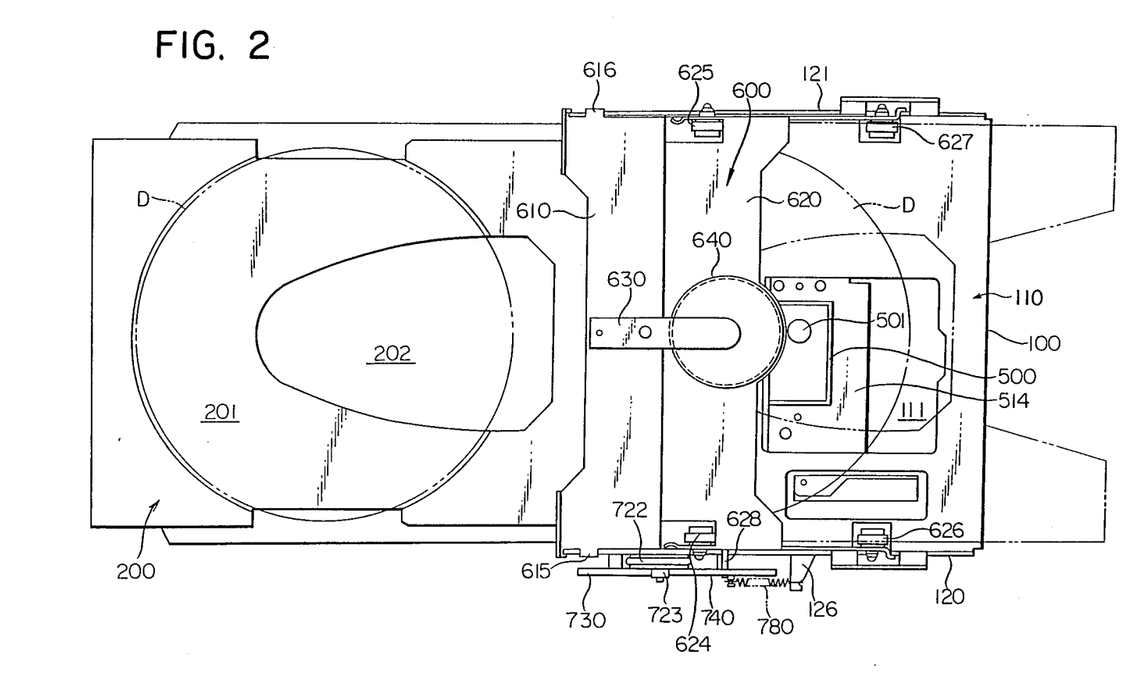
FIG. 2 is an enlarged top plan view of the disk setting mechanism illustrated in FIG. 1.
Figure 3:
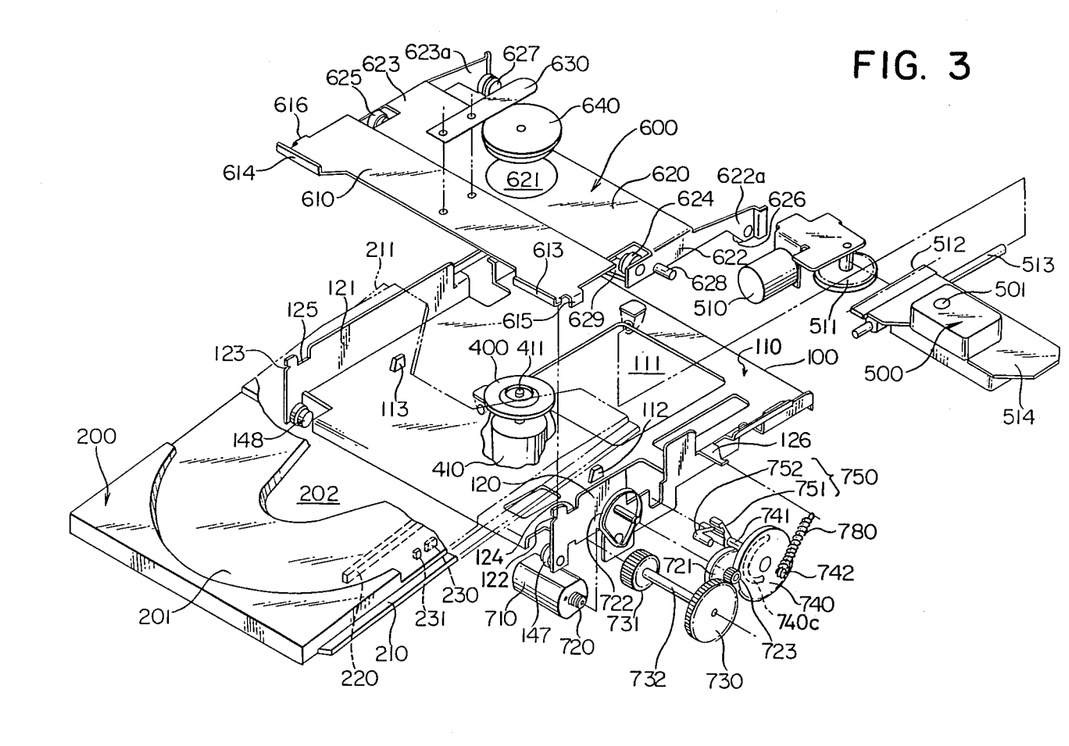
FIG. 3 is an exploded perspective view of the disk setting mechanism illustrated in FIG. 1.
Figure 4:
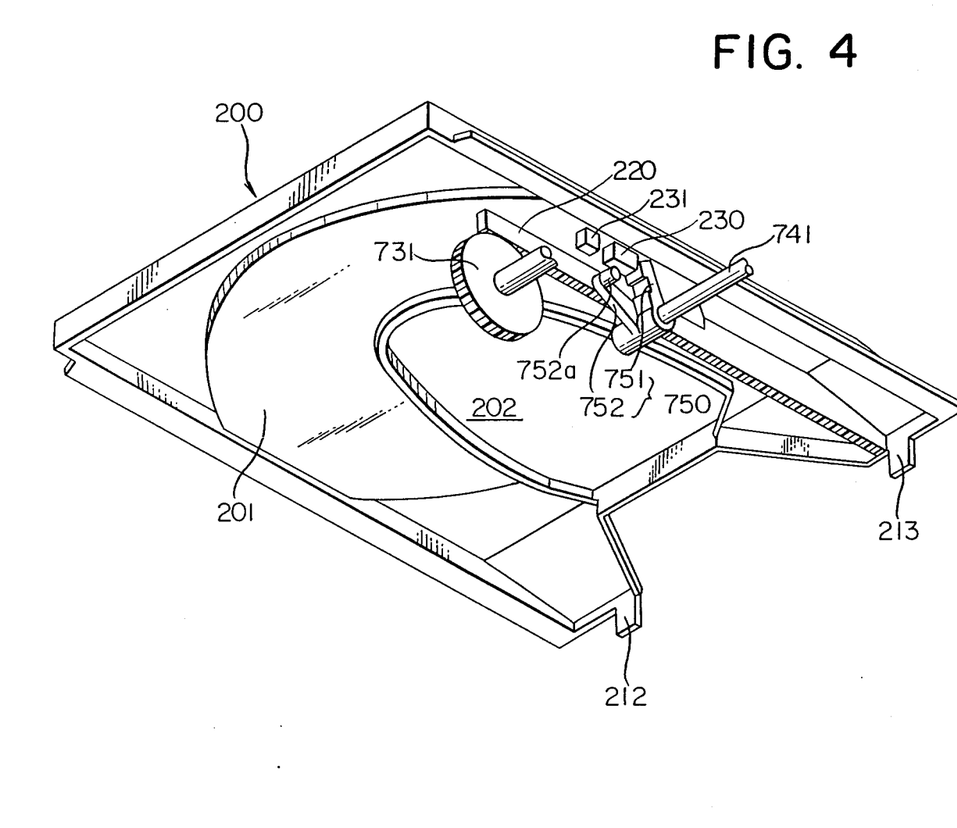
FIG. 4 is a bottom perspective view of the disk tray showing the relationship between a roller and a rack as well as between a lockable arm member and a pair of bosses.

FIGS. 1 through 3 shows a disk setting mechanism embodying the invention to be incorporated in a disk player such as illustrated in FIG. 12.

The disk setting mechanism shown principally comprises, as readily seen in FIG. 3, a chassis 100, a disk clamp member 600 located above the chassis 100, and a disk tray 200 received between the chassis 100 and the disk clamp member 600 to be reciprocally transferred between its inwardly retracted position and its outwardly projected position relative to the chassis 100.

The disk tray 200 has formed thereon a circular disk receiving seat 201 for receiving a disk D thereon (see FIG. 2), and an admitting hole 202 which allows a turntable 400 and an optical pick-up body 500, which will be described later, to pass therethrough when the disk tray 200 is held at its inwardly retracted position (that is, the play position).

The disk tray 200 is provided with a pair of guide wings 210, 211 formed at opposite widthwise ends thereof and extending in the feeding direction thereof. A rack bar 220 is secured to the rear surface of the disk tray 200, and when the disk tray 200 is located at or adjacent its outwardly projected position, a pinion gear 731 mounted on the chassis 100 which will be described later is meshed therewith so as to reciprocally transfer the disk tray 200 in its feeding direction.

The disk tray 200 is furthermore provided with a pair of bosses 230 and 231 downwardly planted on the rear surface thereof with a predetermined interval between the pair of bosses 230 and 231 in the feeding direction of the disk tray 200 to be engaged with a rockable arm member 750 mounted on the chassis 100 which will be described later on.

The chassis 100 comprises a bottom plate 110 and a pair of upright side plates 120, 121.

As a substantially central portion of the bottom plate 110, a spindle motor 410 is mounted with an output shaft 411 thereof extending upwardly through the bottom plate 110. A turn-table 400 is secured to the output shaft 411 to be rotated by the driving force of the spindle motor 410.

Adjacent to the turn-table 400, on the bottom plate 110, a rectangular opening 111 is formed within which an optical pick-up body 500 is positioned. The optical pick-up body 500 is mounted on a carriage 514 which is reciprocally slid along a sliding shaft 513 by the driving force of a motor 510 transmitted to the carriage 514 through a gear 511 and a rack 512. The optical pick-up body 500 serves as an information reading device and is provided with an objective lens 501 positioned oppositely from the disk D when the latter is loaded to its playing position.

A pair of idler rollers 147, 148 are mounted on the downwardly extended front lower ends of the side plates 120, 121 of the chassis 100, respectively, so as to contact the guide wings 210, 211 to guide the reciprocal movements of the disk tray 200.

The disk clamp member 600 is stepped at an intermediate portion thereof to define a cover plate section 620 and a mounting plate section 610.

The mounting plate section 610 is provided with, at its opposite widthwise end portions, a pair of bent engaging lugs 613, 614 to be engaged in engaging notches 122, 123 formed on the upright side plates 120, 121, respectively, of the chassis 100 and a pair of bent hooks 615, 616 to be received in guide recesses 124, 125 formed on the upright side plates 120, 121, respectively.

The cover plate section 620 of the disk clamp member 600 has a pair of downwardly bent side walls 622, 623 formed at opposite widthwise ends of the disk clamp member 600. Each of the side walls 622, 623 has an extension 622a, 623a which extends towards the interior of the disk player. A pair of idler rollers 624, 625 are mounted on the inner surfaces of the side walls 622, 623, respectively, and another pair of rollers 626, 627 are mounted on the inner surfaces of the extensions of the side walls 622, 623, respectively.

The disk clamp member 600 is provided with an engaging pin 628 positioned on the side wall 622 to be received in a cam slot 740c of a cam gear 740 of a feeding and tilting mechanism 700 which will be described later.

A spring plate 630 is secured at its base end to a widthwide central portion of the mounting plate section 610 of the disk clamp member 600 by means of fastening screws, not shown. The spring plate 630 acts to press a clamper 640 received within an opening 621 perforated at a central portion of the cover plate section 620 of the clamp member 600 so that the clamper 640 may extend downwardly through the opening 31 while remaining the semispherical top portion of the clamper 640 remains opposed to a free end portion of the spring plate 630.

A feeding and tilting mechanism 700 is provided on the side plate 120 of the chassis 100 and generally comprises a motor 710, a small diameter pulley 720 secured to an output shaft of the motor 710, a large diameter pulley 721, a pair of gears 730, 731, a cam gear 740 and a rockable arm member 750. A rope belt 722 is bridged between the small diameter pulley 720 and the large diameter pulley 721. A connecting shaft 732 is bridged between the gears 730 and 731. A small gear 723 is integrally and coaxially formed on the large diameter pulley 721.

The cam gear 740 has a toothed portion 740a and a non-toothed portion 740b on an outer periphery thereof and has a cam slot 740c which is formed on an inner side surface thereof. The gear 730 is held in meshed engagement with the small gear 723, and the cam gear 740 is located such that the toothed portion 740a thereof may be meshed with the small gear 723. The motor 710 is driven to rotate, in response to operation of a loading button, not shown, in a direction to take in the disk tray 200 from its outwardly projected position toward its inwardly retracted position.

Thus, as the motor 710 is driven to rotate, the disk tray 200 is drawn into the disk player by a driving force transmitted to the disk player from the motor 710 via the pulley 720, the small gear 723 and the gears 730, 731. After the disk tray 200 has been drawn inside the disk player, the rollers 626, 627 carried by the disk clamp member 600 are slidably engaged with the guide wings 210, 211 of the disk tray 200 to thereby stably support the disk tray 200.

The rockable arm member 750 comprises a leading arm 751 and a trailing arm 752 arranged to form a V letter. The trailing arm 752 is bent to form a pin portion 752a. The cam gear 740 is connected in an integral relationship to the rockable arm member 750 via a connecting shaft 741.

The cam slot 740c of the cam gear 740 has a same radius portion having a same radius of curvature around the rotation center of the cam gear 740 and a varying radius portion extending from the same radius position gradually approaching the center of rotation of the cam gear 470. An arresting pin 742 is planted on the cam gear 740 while an arresting wing 126 is formed on the side wall 120 of the chassis 100. A coil spring 780 extends between the arresting pin 742 and the arresting wing 126 for urging the cam gear 740 to rotate in a counter-clockwise direction in FIG. 1. The rotary angle of the cam gear 740 is restricted by the engagement between the cam slot 740c and the pin 628 of the disk clamp member 600, and the arresting pin 742 to which the coil spring 780 is anchored is attached at a position where the biasing force of the coil spring 780 does not change by the rotation of the cam gear 740 at the above restricted rotary angle.

Thus, the toothed portion 740a of the cam gear 740 is arranged such that the cam gear 740 is rotatable when said toothed portion 470a is meshed with the small gear 723, toward and held at a position where the pin 628 contacts one end of the cam slot 740c on the varying radius portion thereof against the biasing force of said spring means. Further, the toothed portion 740a is disengaged from the small gear 723 when the cam gear 740 is at the position where the pin 628 contacts the other end of the cam slot 740c on the same radius portion thereof. The toothed portion 740a is normally away from the meshed engagement with the small gear 723 by the biasing force of the coil spring 780, where the pin 628 contacts one end of the cam slot 740c on the same radius portion thereof, while the disk tray 200 is at its outwardly projected position. The toothed portion 740a falls into the meshed engagement with the small gear 723 when the cam gear 740 is rotated in the clockwise direction against the biasing force of the coil spring 780 with the leading arm 751 of the rockable arm member 750 being contacted and pushed by the boss 230 of the disk tray 200 during the movement of the disk tray 200 from its outwardly projected position to its inwardly retracted position.

The leading arm 751 of the rockable arm member 750 is arranged to be able to contact the boss 230 after the cam gear 740 is rotated in the counter-clockwise direction upon the rotation of the small gear 723 which is meshed with the toothed portion 740a against the biasing force of the coil spring 780 for taking out the disk tray 200 from its inwardly retracted position.

Figure 9:
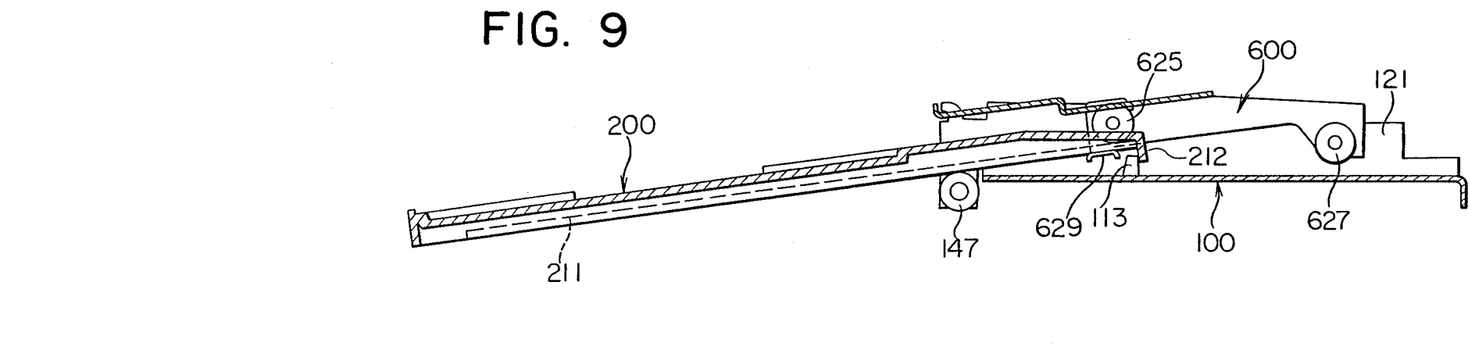
FIG. 9 is a side sectional view showing the disk tray held at its outwardly projected position in its inclined state.
Figure 10:
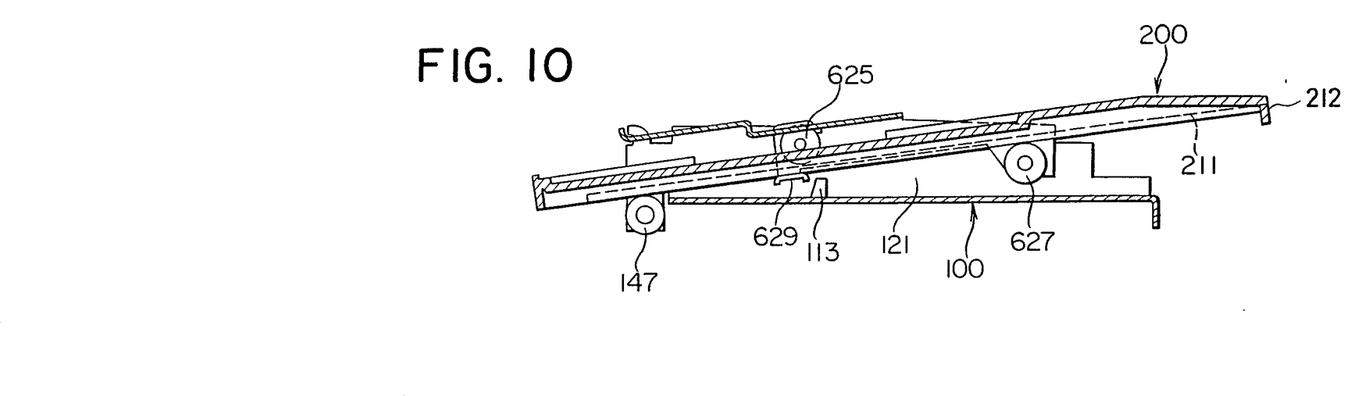
FIG. 10 is a side sectional view showing the disk tray during drawing operation to its inwardly retracted position in its inclined state.

The above constructed mechanism operates as follows. The disk tray 200, when it is at its outwardly projected position, is vertically inclined relative to the chassis 100 as illustrated in FIG. 9, and the rollers 624, 625, 147 and 148 cooperate for holding the disk tray 200 in its inclined state. Further, a pair of downwardly bent plates 212, 213 of the disk tray 200 contact a pair of stoppers 112, 113 planted on the bottom plate 110 of the chassis 100. More particularly, the guide wings 210, 211 passes through the pairs of upper and lower rollers 624, 147 and 625, 148 to be slidably guided. Thus, under this condition, the disk tray 200 is feedable inside the disk player while maintaining its vertically inclined state as illustrated in FIG. 10. In the meantime, a pair of supporting plates 629, 629 are inwardly projected under the rollers 624, 625 from the inner surfaces of the side walls 622, 623, respectively, of the disk clamp member 600, for supplementally supporting the disk tray 200 between the rollers 624, 625 and the supporting plates 629, 629.

Figure 5:
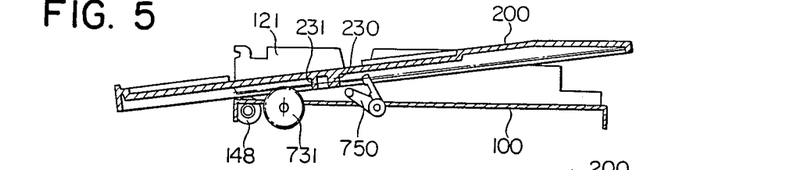
FIG. 5 is a side elevational view showing the relationship between a roller and a rack as well as between a lockable arm member and a pair of bosses.
Figure 6:
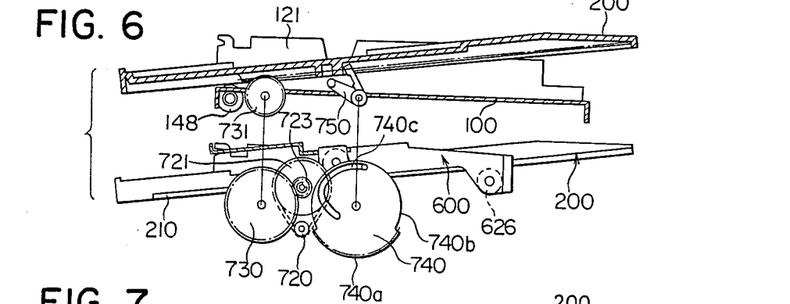
FIGS. 6 through 8 are explanatory views showing shifting operation of the disk tray between its inclined state and its horizontal state.

When, the disk tray 200 is drawn from its outwardly projected position toward the interior of the disk player upon the rotation of the gear 731 driven by the motor 710, the cam gear 740 is not rotated, as the toothed portion 740c of the cam gear 740 does not mesh with the small gear 723 as illustrated in FIGS. 5, until the leading arm 751 of the rockable arm member 750 contacts the boss 230 of the disk tray 200. After the leading arm 751 has contacted and been pushed by the boss 230 as illustrated in FIG. 6, the cam gear 740 begins to rotate in a clockwise direction. At this point, as the cam gear 740 rotates against the biasing force of the coil spring 780 due to the meshed engagement between the toothed portion 740c and the small gear 723, the engaging pin 628 on the disk clamp member 600 is first guided along the same radius portion of the cam slot 740c toward the varying radius portion thereof. While the engaging pin 628 is guided along the same radius portion of the cam slot 740c, the clamp member 600 maintains its inclined state.

Figure 7:
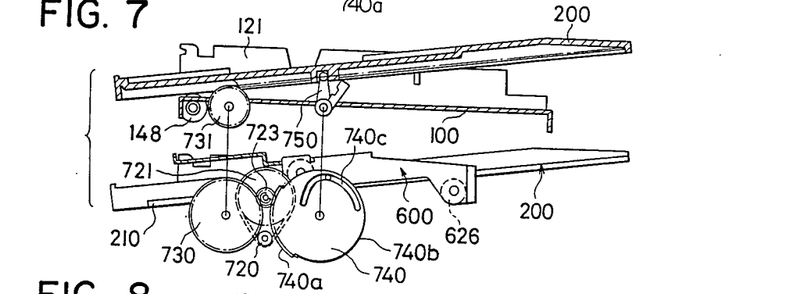

The cam gear 740 is arranged such that the toothed portion 740a of cam ear 740 is meshed by the gear 723 substantially at the same time as the pin 752a on the rockable arm member 750 is received in the space between the pair of bosses 230, 231 of the disk tray 200. Accordingly, the cam gear 740 is driven to rotate in the clockwise direction by the small gear 723 after the toothed portion 740a thereof has been meshed with the small gear 723. As the cam gear 740 is rotated in the clockwise direction, the disk tray 200 is further fed toward the interior of the disk player as illustrated in FIG. 7 upon the rotary motion of the rockable arm member 750. Simultaneously, the meshing engagement between the rack 220 of the disk tray 200 and the gear 731 is released.

Figure 8:
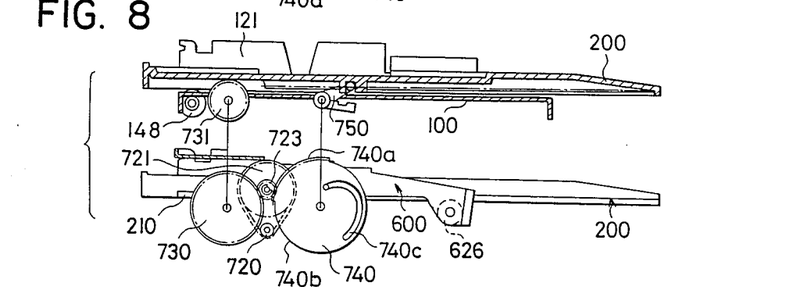
Figure 11:
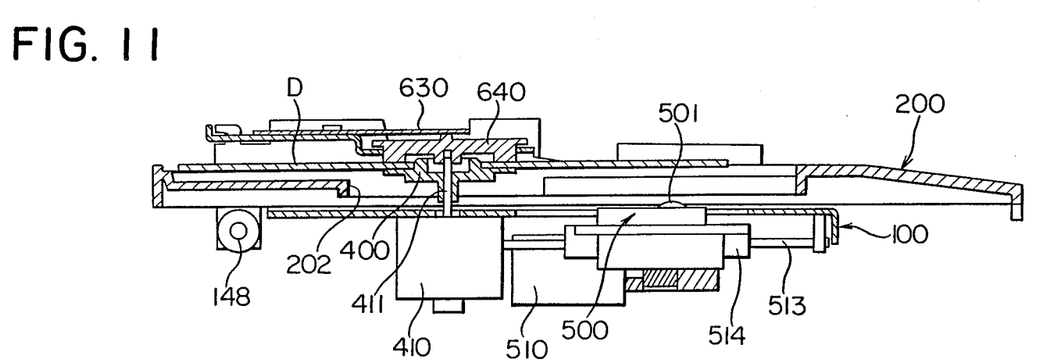
FIG. 11 is a side sectional view showing the disk tray held at its inwardly retracted position in its horizontal state wherein the disk is seated on a turntable.

When the pin 628 of the disk clamp member 600 moves along the varying radius portion of the cam slot 740c of the cam gear 740, the clamp member 600 is tilted downwardly toward the turn-table 400 around an engaging point between the bent engaging lugs 613, 614 thereof and engaging notches 122, 123 of the chassis 110. As the clamp member 600 is tilted in this manner, the disk tray 200 is drawn in toward the interior of the disk player while being shifted from the inclined state to the horizontal state, as illustrated in FIG. 8. Thus, as the disk tray 200 is tilted, the disk D seated thereon is set on the turn-table 400 and is clamped for rotation between the clamper 640 and the turn-table 400, thereby completing loading of the disk D, as illustrated in FIG. 11. It is to be noted that the motor 710 is then stopped in response to a signal from a detecting switch, not shown, which detects the disk D loaded in position.

In this condition, the spindle motor 410 is driven to rotate the turn-table 400, and at the same time the slider motor 510 is driven to drive the optical pickup body 500, in order to reproduce information of the disk D.

To take out the disk D from the disk player, a switch, not shown, is operated to drive the motor 710 to rotate the reverse direction. Consequently, the cam gear 740 is rotated in the counter-clockwise direction to tilt the clamp member 600 upwardly around the engaging notches 122, 123 of the chassis 100 and the disk tray 200 is fed toward its outwardly projected position while shifting the disk tray 200 from its horizontal state to its inclined state upon the reverse rotation of the trailing arm 752 of the rockable arm member 750. On the way of the movement, the pin 752a on the trailing arm 752 is disengaged from the boss 231 of the disk tray 200 and the meshing engagement between the toothed portion 740a of the cam gear 740 and the small gear 723 is cancelled. Thereupon, the rack 220 is brought into meshed engagement with the gear 731 so that the disk tray 200 is thereafter fed further toward its outwardly projected position while maintaining the inclined state. In the meantime, after having cancelled the meshed engagement with the small gear 723, the cam gear 740 is rotated in the counterclockwise direction by the biasing force of the coil spring 780 to restore the feeding and tilting mechanism 700 to its original and/or normal state illustrated in FIG. 6.

As aparent from the foregoing descriptions, according to a disk setting mechanism of the present invention, when the disk plate is in its outwardly projected position, it is held in a downwardly inclined state relative to the disk player. Accordingly, the disk can be easily placed onto and taken out of the disk tray. Further, since the disk setting mechanism is constructed such that the disk tray is tilted in cooperation with the disk clamp member, the disk setting mechanism can be simplified in construction comparing to the conventional construction thereof wherein the disk tray is fed between its outwardly projected position and its inwardly retracted position by the combination of the horizontal motion and the vertical motion of the disk tray.

Having now fuly described the invention, it will be apparent to one of ordinary skill in the art that many changes and modifications can be made thereto without departing from the spirit and scope of the invention as set forth herein.

What is claimed is:

1. A disk setting mechanism for a disk player including a disk tray for receiving a disk thereon, said disk tray being reciprocally moved between an inwardly retracted position and an outwardly projected position through an intermediate position, said disk setting mechanism comprising:
   holding means for holding said disk tray when said disk tray is at the outwardly projected position so that said disk tray is inclined downwardly, at a given angle of inclination towards a front end of the disk tray;
   first feeding means for reciprocally transferring said disk tray, between the outwardly projected position and the intermediate position, along the angle of inclination of said disk tray;
   second feeding means for horizontally transferring said disk tray between the intermediate position and the inwardly retracted position while allowing said disk tray to be shifted between the inclined state and a horizontal state; and
   shifting means for shifting said disk tray between the inclined state and the horizontal state while allowing said disk tray to be horizontally transferred between the intermediate position and the inwardly retracted position.

2. The disk setting mechanism according to claim 1 wherein said holding means comprises a disk clamp member for relatively slidably receiving said disk tray therein, said clamp member being vertically swingable about the disk-entrance-side end of the disk player.

3. The disk setting mechanism according to claim 2 wherein said disk tray is provided with a pair of side wings extending in its feeding direction, and wherein said disk clamp member is provided with a pair of first guide rollers and a pair of guide plates, each of said first guide rollers facing a corresponding one of said guide plates to receive a corresponding one of said side wings of said disk tray between said first guide roller and said guide plates.

4. The disk setting mechanism according to claim 3 wherein said disk clamp member is further provided with a pair of second guide rollers positioned at a predetermined distance from said first guide rollers for receiving said disk tray between said first guide rollers and said second guide rollers.

5. The disk setting mechanism according to claim 1 which further comprises a chassis, and wherein said first feeding means comprises a rack member secured to said disk tray and a pinion gear mounted on said chassis to be meshed with said rack member.

6. The disk setting mechanism according to claim 5 wherein said holding means comprises a disk clamp member for relatively slidably receiving said disk tray therein, said disk clamp member being vertically swingable about the disk-entrance-side end of the disk player.

7. The disk setting mechanism according to claim 1 which further comprises a chassis, and wherein said second feeding means comprises a rockable arm member swingably mounted on said chassis while said disk tray is provided with a cooperating member to be engaged with said rockable arm to tilt the disk tray upon the swinging movement of said rockable arm member.

8. The disk setting mechanism according to claim 2 further comprising a turn-table for mounting a disk thereon, and wherein said disk clamping member is provided with a spring plate for biasing said disk toward said turn-table when said disk clamp member is swung to its play position.

9. The disk setting mechanism according to claim 1 further comprising stopper means for regulating the outwardly projected position of said disk tray.

10. The disk setting mechanism according to claim 1 further comprising optical pick-up means for reading the information recorded on said disk, supporting means for reciprocally movably supporting said optical pick-up means, and driving means for reciprocally moving said optical pick-up means relative to said disk.

11. A disk setting mechanism for a disk player including a disk tray for receiving a disk thereon, said disk tray being reciprocally moved between an inwardly retracted position and an outwardly projected position through an intermediate position, said disk setting mechanism comprising:
   holding means for holding said disk tray when said disk tray is at the outwardly projected position where it is inclined downwardly toward a front end of the disk tray;
   first feeding means for reciprocally transferring said disk tray between the outwardly projected position and the intermediate position while maintaining said disk tray in the inclined state;
   second feeding means for transferring said disk tray between the intermediate position and the inwardly retracted position while shifting said disk tray between the inclined state and the horizontal state; and
   a chassis;
   wherein said second feeding means comprises a rockable arm member swingably mounted on said chassis while said disk tray is provided with a cooperating member to be engaged with said rockable arm member to tilt and disk tray upon the swinging movement of said rockable arm member;
   wherein said rockable arm member is V-shaped while said cooperating member is inverted-U-shaped, and wherein one leg of said V-shaped rockable arm member is contactable with one leg of said inverted-U-shaped cooperating member upon the reciprocable movement of the disk tray while the other leg of said rockable arm member is inserted into the space between two legs of said cooperating member.

12. A disk setting mechanism for a disk player including a disk tray for receiving a disk thereon, said disk tray being reciprocally moved between an inwardly retracted position and an outwardly projected position through an intermediate position, said disk setting mechanism comprising:
   holding means for holding said disk tray when said disk tray is at the outwardly projected position where it is inclined downwardly toward a front end of the disk tray;

first feeding means for reciprocally transferring said disk tray between the outwardly projected position and the intermediate position while maintaining said disk tray in the inclined state;

second feeding means for transferring said disk tray between the intermediate position and the inwardly retracted position while shifting said disk tray between the inclined state and the horizontal state; and a chassis;

wherein said second feeding means comprises a rockable arm member swingably mounted on said chassis while said disk tray is provided with a cooperating member to be engaged with said rockable arm member to tilt the disk tray upon the swinging movement of said rockable arm member;

wherein said second feeding means further comprises a rotary cam member coaxially and integrally connected to said rockable arm member, and wherein said holding means comprises a disk clamp member for relatively slidably receiving said disk tray thereon, said disk clamp member being tilted upon the rotation of said rotary cam member.

13. The disk setting mechanism according to claim 12 wherein said rotary cam member is provided with a cam slot having a constant radius curvature portion around the rotary center of said rotary cam member and a varying radius curvature portion gradually approaching the rotary center of said rotary cam member, and wherein said disk clamp member is provided with a pin received in said cam slot, and wherein said disk clamp member is held in its inclined state when said pin engaging said constant radius curvature portion while shifted its horizontal state when said pin engaging said varying radius curvature portion.

14. The disk setting mechanism according to claim 12 wherein said first feeding means comprises a rack member secured to said disk tray and a pinion gear mounted on said chassis to be meshed with said rack member.

15. The disk setting mechanism according to claim 14 further comprising gear means transmitting to a driving force to said pinion gear, and wherein said rotary cam member is formed as a circular member having formed a part of an outer periphery thereof a toothed portion and other part an non-toothed portion so as to selectively received the driving force transmitted to said pinion gear from said gear means.

16. The disk setting mechanism according to claim 15 wherein said rotary cam member is provided with a cam slot having a constant radius curvature portion around the rotary center of said rotary cam member and a varying radius curvature portion gradually approaching the rotary center of said rotary cam member, wherein said disk clamp member is provided with a pin received in said cam slot, wherein said disk clamp member is held in its inclined state when said pin engages said constant radius curvature portion while it is shifted into its horizontal state when said pin engages said varying radius curvature portion, and which further comprises a biasing means for biasing said rotary cam member to rotate in the direction that said pin engages said constant radius curvature portion of said cam slot.

17. The disk setting mechanism according to claim 16 wherein said rockable arm member is V-shaped while said cooperating member is inverted-U-shaped, and wherein one leg of said V-shaped rockable arm member is contactable with one leg of said inverted-U-shaped cooperating member upon the reciprocal movement of the disk tray while the other leg of said rockable arm member is insertable into the space between two legs of said cooperating member, and wherein said biasing means normally holds said rotary cam member at a position where said one leg of said rockable arm member is contactable with said one leg of said cooperating member.

18. The disk setting mechanism according to claim 17 wherein said biasing means is arranged such that the biasing direction of said biasing means does not change during the rotation of said cam gear, the rotary angle of said cam gear being restricted by the engagement of said pin and said cam slot.

19. The disk setting mechanism according to claim 18 wherein said spring means is arranged to bias said cam gear to rotate it to a position which corresponds to one end of said restricted rotary angle thereof.

20. The disk setting mechanism according to claim 19 wherein said toothed portion is arranged such that said cam gear is rotatable, when said toothed portion is meshed with said gear means, toward and held at a position were corresponds to the other end of said restricted rotary angle against the biasing force of said spring means.

21. The disk setting mechanism according to claim 20 wherein said toothed portion is arranged to be disengaged from said gear means when said cam gear is at said position at said one end of the restricted rotary angle.

22. A disk setting mechanism for a disk player, said mechanism including a disk tray adapted to receive a disk, said tray being movable between an inwardly retracted position and an outwardly projected position, said tray having an upper disk holding surface and a lower tray surface, said disk setting mechanism comprising:

(a) means for moving the disk tray between said retracted position and said projected position;

(b) means for holding the disk tray in an inclined condition when in said projected position, wherein both said upper disk holding surface and said lower tray surface are inclined downwardly towards a front edge of said tray, said means for holding comprising a disk clamp member for relatively slidable receiving said disk tray, said disk clamp member being vertically swingable about an end of said disk player which is adapted to receive said disk tray; and (c) said disk tray being provided with a pair of side wings extending in the direction of movement between the retracted position and the projected position, wherein said disk clamp member is provided with a pair of first guide rollers and a pair of guide plates, each of said first guide rollers facing a corresponding one of said guide plates to receive the corresponding one of said wings of said disk tray between said first guide roller and said guide plates.

23. The disk setting mechanism as recited in claim 22, wherein said disk clamp member is further provided with a pair of second guide roller positioned at a predetermined distance from said first guide roller for receiving said disk tray between said first guide rollers and said second guide rollers.

24. The disk setting mechanism as recited in claim 22, further comprising a chassis, wherein said means for moving comprises a rack member secured to said disk tray and a pinion gear mounted on said chassis and adapted to be meshed with said rack member.

25. The disk setting mechanism as recited in claim 22, further comprising a turntable for mounting a disk thereon, and wherein said disk clamping member is provided with a spring plate for biasing said disk towards said turntable when said disk clamp member is swung to a play position.

26. The disk setting mechanism as recited in claim 24, further comprising stopper means for regulating the projected position of said disk tray.

27. The disk setting mechanism as recited in claim 22, further comprising optical pick-up means for reading the information recorded on said disk, supporting means for reciprocally moveably supporting said optical pick-up means, and driving means for reciprocally moving said optical pick-up means relative to said disk.

28. A disk setting mechanism for a disk player, said mechanism including a disk tray adapted to receive a disk, said tray being movable between an inwardly retracted position and an outwardly projected position, said tray having an upper disk holding surface and a lower tray surface, said disk setting mechanism comprising means for moving said disk tray between said retracted position and said projected position, and means for holding said disk tray in an inclined condition when in said projected position, wherein both said upper disk holding surface and said lower tray surface are inclined downwardly towards a front edge of said tray, said mechanism further comprising a chassis, wherein said means for moving comprises a rockable arm member swingably mounted on said chassis, said disk tray being provided with a cooperating member adapted to be engaged with said rockable arm to tilt the disk tray upon swinging movement of said rockable arm member.

29. A disk setting mechanism for a disk player including a movable disk tray, said mechanism including means for holding the disk tray in an inclined position, which inclined position inherently defines an angle of inclination with respect to the horizontal, and means for moving the disk tray along the angle of inclination said mechanism further comprising means for placing the disk tray into a horizontal position from said inclined position and for moving the disk tray generally horizontally.

30. The disk setting mechanism as recited in claim 29, wherein said means for placing the disk tray into a horizontal position and moving the disk tray generally horizontally comprises means for simultaneously moving the disk tray into said horizontal position and for moving the disk tray generally horizontally.

31. The disk setting mechanism as recited in claim 29, further comprising a turntable for mounting a disk thereon, wherein said disk clamping member is provided with a spring plate for biasing said disk towards said turntable when said disk clamp member is swung into a play position.

32. The disk setting mechanism as recited in claim 29, further comprising stopper means for regulating the inclined position of said disk tray.

33. The disk setting mechanism as recited in claim 29, further comprising optical pick-up means for reading information recorded on said disk, supporting means for reciprocally movably supporting said optical pick-up means, and driving means for reciprocally moving said optical pick-up means relative to said disk.

34. A disk setting mechanism for a disk player including a movable disk tray, said mechanism includes means for holding the disk tray in an inclined position, which inclined position inherently defines an angle of inclination with respect to the horizontal, said disk player having an end which is adapted to receive said disk tray, said means for holding comprising a disk clamp member for relatively slidably receiving said disk tray, said clamp member being vertically swingable about said end of the disk player, said mechanism including means for moving said disk tray along said angle of inclination, wherein said disk tray includes a pair of side wings extending in said moving direction, said disk clamp member being provided with a pair of first guide rollers facing a corresponding one of said guide plates to receive a corresponding one of said side wings of said disk tray between said first guide roller and said guide plates.

35. The disk setting mechanism as recited in claim 34, wherein said disk clamp member is further provided with a pair of second guide rollers positioned at a predetermined distance from said first guide rollers.

36. The disk setting mechanism as recited in claim 29, further comprising a chassis, wherein said means for moving comprises a rack member secured in said disk tray and a pinion gear mounted on said chassis and adapted to be meshed with said rack member.

37. A disk setting mechanism for a disk player including a movable disk tray, said mechanism comprising means for holding the disk tray in an inclined position, which inclined position inherently defines an angle of inclination with respect to the horizontal, and means for moving the disk tray along the angle of inclination, said mechanism further comprising a chassis, wherein said means for moving comprises a rockable arm member swingably mounted on said chassis while said disk tray is provided with a cooperating member adapted to be engaged with said rockable arm to tilt the disk tray upon the swinging movement of said rockable arm member.

38. A disk setting mechanism for a disk player, said mechanism including a disk tray adapted to receive a disk, said tray being movable between an inwardly retracted position and an outwardly projected position, said tray having an upper disk holding surface and a lower tray surface, said disk setting mechanism comprising means for moving the disk tray between said retracted position and said projected position, and means for holding the disk tray in an inclined condition when in said projected position, wherein both said upper disk holding surface and said lower tray surface are inclined downwardly towards a front edge of said tray, wherein said disk tray is movable between said inwardly retracted position and said outwardly projected position through an intermediate position, wherein said disk setting mechanism further comprises means for moving said disk tray from said intermediate position to said inwardly retracted position by simultaneously moving said disk tray rearwardly and from an inclined position to a substantially horizontal position.

39. A disk setting mechanism for a disk player including a movable disk tray, said mechanism including means for holding the disk tray in an inclined position, which inclined position inherently defines an angle of inclination with respect to the horizontal, and means for moving the disk tray along the angle of inclination, wherein said disk tray is movable between an inwardly retracted position and an outwardly projected position through an intermediate position, said disk setting mechanism further comprising means for moving said disk tray from said intermediate position to said inwardly retracted position by simultaneously moving said disk tray rearwardly and from an inclined position to a substantially horizontal position.

* * * * *

UNITED STATES PATENT AND TRADEMARK OFFICE
CERTIFICATE OF CORRECTION

PATENT NO. : 4,862,445

DATED : August 29, 1989

INVENTOR(S) : Masahiko SASAKI

It is certified that error appears in the above-identified patent and that said Letters Patent is hereby corrected as shown below:

On the title page,
in the Abstract, line 16, after "retracted" insert ---position---;
column 1, line 23, after "player" inset ---,---;
column 1, line 29, after "is" delete ",";
column 1, line 43, after "from" insert ---,---;
column 2, line 56, change "shows" to ---show---;
column 4, line 10, delete "remaining";
column 5, line 52, after "When" delete ",";
column 5, line 57, change "FIGS" to ---FIG---;
column 6, line 5, change "ear" to ---gear---;
column 6, line 64, change "aparent" to ---apparent---;
column 7, line 10, change "fuly" to ---fully---;
column 8, line 50 (claim 11, line 25), change "and" to ---the---;
column 9, line 35 (claim 13, line 10), change "while shifted" to ---while it is shifted into---;

UNITED STATES PATENT AND TRADEMARK OFFICE
CERTIFICATE OF CORRECTION

PATENT NO. : 4,862,445

DATED : August 29, 1989

INVENTOR(S) : Masahiko Sasaki

It is certified that error appears in the above-identified patent and that said Letters Patent is hereby corrected as shown below:

column 10, line 24 (claim 20, line 5), change "were" to ---which---;
    column 10, line 63 (claim 23, line 3), change "roller" to ---rollers---;
    column 10, line 64 (claim 23, line 4), change "roller" to ---rollers---;
    column 11, line 6 (claim 25, line 3), delete "and"; and
    column 11, line 10 (claim 26, line 1), change "24" to ---22---.

Signed and Sealed this

Fifth Day of May, 1992

Attest:

DOUGLAS B. COMER

*Attesting Officer*    *Acting Commissioner of Patents and Trademarks*